(12) United States Patent
Miles

(10) Patent No.: US 8,596,948 B2
(45) Date of Patent: Dec. 3, 2013

(54) AUTOMATED ARRANGEMENT FOR LOADING BOTTLES INTO SHIPPING RACKS

(76) Inventor: Gregory W. Miles, Sunbury, PA (US)

(*) Notice: Subject to any disclaimer, the term of this patent is extended or adjusted under 35 U.S.C. 154(b) by 1248 days.

(21) Appl. No.: 11/906,423

(22) Filed: Oct. 1, 2007

(65) Prior Publication Data

US 2008/0267744 A1    Oct. 30, 2008

Related U.S. Application Data

(60) Provisional application No. 60/850,163, filed on Oct. 6, 2006.

(51) Int. Cl.
*B65G 1/127*    (2006.01)
*B65G 1/12*    (2006.01)

(52) U.S. Cl.
USPC ............ 414/331.08; 414/331.01; 414/331.02; 414/331.03; 414/331.16

(58) Field of Classification Search
USPC .............. 414/331.01–331.03, 331.08, 331.16
See application file for complete search history.

(56) References Cited

U.S. PATENT DOCUMENTS

| | | | | |
|---|---|---|---|---|
| 3,643,780 A | * | 2/1972 | Shimogaki et al. | ............ 198/408 |
| 4,621,969 A | * | 11/1986 | Berghall et al. | .......... 414/331.07 |
| 4,929,140 A | | 5/1990 | Baker | |
| 5,244,330 A | | 9/1993 | Tonjes | |
| 5,310,300 A | * | 5/1994 | Crabb et al. | .................. 414/280 |
| 5,895,195 A | | 4/1999 | Simmons et al. | |
| 5,927,927 A | | 7/1999 | Anderson et al. | |
| 6,003,654 A | * | 12/1999 | Webber et al. | ................ 198/408 |
| 6,142,300 A | | 11/2000 | Kelly et al. | |
| 6,503,043 B1 | | 1/2003 | Smith et al. | |
| 2006/0182604 A1 | | 8/2006 | Clark et al. | |

* cited by examiner

*Primary Examiner* — Scott Lowe
(74) *Attorney, Agent, or Firm* — Wendy W. Koba

(57) ABSTRACT

An automated arrangement for filling a shipping rack structure with water bottles (or any other type of bottle) includes an elevator arrangement and a pusher component, both under the control of a programmed control element (such as a microprocessor), to automatically present a plurality of filled bottles to an open rack "column" and move (push) the bottles from the elevator into the rack. The loader system is pre-programmed with inputs including the array size of the rack being loaded (i.e., how many bottles "deep" along each rail, the number of rows in the rack and the number of columns in the rack). With this information, the elevator will thus lift the proper number of bottles into place to fill a column, and then stop. Once the elevator stops, the pusher component will advance to move the column of bottles into the rack. The pusher then retracts, the elevator is re-started, and the next column of filled bottles is loaded into the elevator.

9 Claims, 7 Drawing Sheets

AUTOMATED ARRANGEMENT FOR LOADING BOTTLES INTO SHIPPING RACKS

CROSS-REFERENCE TO RELATED APPLICATION

This application claims the benefit of U.S. Provisional Application No. 60/850,163, filed Oct. 6, 2006.

TECHNICAL FIELD

The present invention relates to an automated arrangement for loading filled water bottles into a shipping rack and, more particularly, to an automated arrangement that is processor-controlled to fill different types of racks without requiring a physical change in the loader system.

BACKGROUND OF THE INVENTION

As a result of less-than-satisfactory water quality in many cities in the United States (and elsewhere), individuals often purchase bottled drinking water that comes from a variety of different sources. Often, such customers buy spring water that is bottled in five gallon plastic containers and mounted on dispensing units in offices and homes, whereby the water in the bottles can be disposed into cups or the like that are placed under the spigot of the dispensing unit (water cooler).

Since a customer has to lift the filled water bottle and invert it onto the water cooler, the bottle itself must be manageable in terms of its weight and configuration. It has been found that the five gallon size of water bottle is preferred, if not mandated. Not counting the weight of the bottle itself, the water within a filled five gallon container weight approximately forty-four pounds—not an insubstantial amount to lift and guide into the top opening of a water cooler. For this reason, the water bottle itself is formed of a lightweight plastic and comprises a relatively thin-walled configuration (so that the bottle itself has a minimal weight, on the order of only a few pounds).

Due to the thin wall of the plastic bottles, coupled with the weight of the water, these bottles are somewhat fragile and must be handled with care to avoid rupturing the bottles and/or disturbing the seal of the cap. This fragility poses even more significant problems within the bottling and distribution aspects of the commercial water business.

Indeed, the delivery process for such bottle water typically involves filling the plastic bottles with spring water (or the like), capping the bottles with plastic caps, and loading the filled and capped bottles onto shipping racks for delivery to customers. FIG. 1 is a side view of an exemplary prior art "five high" rack 10 including a plurality of support rails 12-1, 12-2, . . . , 12-5 for supporting bottles in a plurality of five rows 14-1, 14-2, . . . , 14-5. As shown, prior art rack 10 is "two deep", meaning that the depth D of rack 10 is sized to accommodate two water bottles. In such a two-deep rack, the bottles may be unloaded from either side to efficiently remove the water at its destination. FIG. 2 is a front view of rack 10, with one water bottle removed to illustrate an exemplary support rail 12. In this exemplary embodiment, rack 10 is shown as having three separate columns 16-1, 16-2 and 16-3.

It is to be understood that the array size of any such rack is matter of design and convenience. Indeed, FIG. 3 is a side view of an alternative prior art rack 20, in this case for supporting smaller (e.g., three gallon) bottles, where prior art rack 20 is formed to include a plurality of rails 22-1, 22-2 and 22-3 in a plurality of three rows 24-1, 24-2 and 24-3. In this embodiment for supporting smaller bottles, rack 20 is formed to comprise a depth d sufficient to support a "three deep" arrangement (i.e., three water bottles supported on each rail 22). FIG. 4 is a front view of prior art rack 20, showing in this embodiment three columns 26-1, 26-2 and 26-3 being used to define the rack structure. Both racks 10 and 20 are formed to include spaced-apart tunnels 11 and 21, respectively, to allow for the rack to be lifted and moved by a fork lift (not shown).

Small bottled water producers often load racks such as those shown in FIGS. 1-4 by hand, with a crew receiving the filled bottles from a filling line, lifting the bottles and guiding them into the various compartments within the rack structure. At times, the bottles must be pushed toward the rear of the rack (e.g., when loading "two deep" or "three deep"). When the racks have compartments "four high" or "five high", the crew must lift the filled bottle (weighing over forty pounds) over four feet in the air to place them in the racks. Such manual loading requires considerable physical exertion to load a single rack structure containing, for example, twenty-four or more bottles. Since the bottles are somewhat fragile, the crew must not "bang" the bottles against the rack or its rails, or the bottles could rupture or the seal caps be compromised.

Obviously, the labor-intensive manual loading of these bottles in racks places the crew at risk for injuries associated with the difficult and repetitive lifting involved. Larger bottled water producers have therefore resorted to large machines for automatically loading water-filled bottles into shipping racks, some machines costing upwards of a million dollars. Further, these machines often consume significant floor space and require high vertical clearances of two stories or more. Machines of this type are disclosed and described in detail in, for example, U.S. Pat. No. 4,929,140 issued to Baker, and U.S. Pat. No. 5,244,330 issued to Tonjes.

Thus, a need remains in the art for an automated arrangement for loading filled bottles into a rack structure that is less expensive and more compact than the arrangements available in the prior art, allowing for small bottled water companies to utilize an automated system.

SUMMARY OF THE INVENTION

The need remaining in the art is addressed by the present invention, which relates to an automated arrangement for loading filled water bottles into a shipping rack and, more particularly, to an automated arrangement that is processor-controlled to fill different types of racks without requiring a physical change in the loader system.

In accordance with the present invention, an automated loader system has been developed that includes an elevator arrangement and a pusher component, both under the control of a programmed control element (such as a microprocessor), to automatically present a plurality of filled bottles to an open rack "column" and move (push) the bottles from the elevator into the rack. The loader system is pre-programmed with inputs including the array size of the rack being loaded (i.e., how many bottles "deep" along each rail, the number of rows in the rack and the number of columns in the rack). With this information, the elevator will thus lift the proper number of bottles into place to fill a column, and then stop. Once the elevator stops, the pusher component will advance to move the column of bottles into the rack. The pusher then retracts, the elevator is re-started, and the next column of filled bottles is loaded into the elevator.

In a preferred embodiment of the invention, the elevator arrangement is formed to include a plurality of "seats" for supporting each bottle as it enters the elevator. Preferably, the outer edge of each seat includes a lip sufficient to prevent the bottle from rolling off the seat as it is lifted. The elevator is preferably formed as a conveyor belt configuration, with the seats continuously rotating about the vertical axis to present an empty seat for the next-available filled bottle.

The pusher component preferably comprises a plurality of separate arms coupled to a single push rod, where each arm engages with an associated bottle for moving the bottle from the elevator into the rack. It is an aspect of the present invention that the use of the programmed control element allows for the pusher component to "know" the proper force for pushing the bottle, and for how far to move the arms forward as a function of how "deep" into the rack the bottles need to be moved. Further, in a preferred embodiment of the present invention, each pusher arm further comprises an end cap of a material suitable for engaging the bottle at the "shoulders" surrounding the bottle cap, thus allowing for the bottles to be pushed by applying force to the bottle itself instead of the bottle cap (where in many prior art automated arrangements the bottle cap is "pushed" to move the bottles and damage occurs when the cap is dented or broken).

The conveyor support for the rack itself may be further configured to include "stop" elements that are used to register the movement of the rack at the completion of filling each column. Inasmuch as the stop elements may be controlled by the same programmed control element as the pusher and the elevator, the movements of each element may be sequenced to form a fully automated arrangement.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
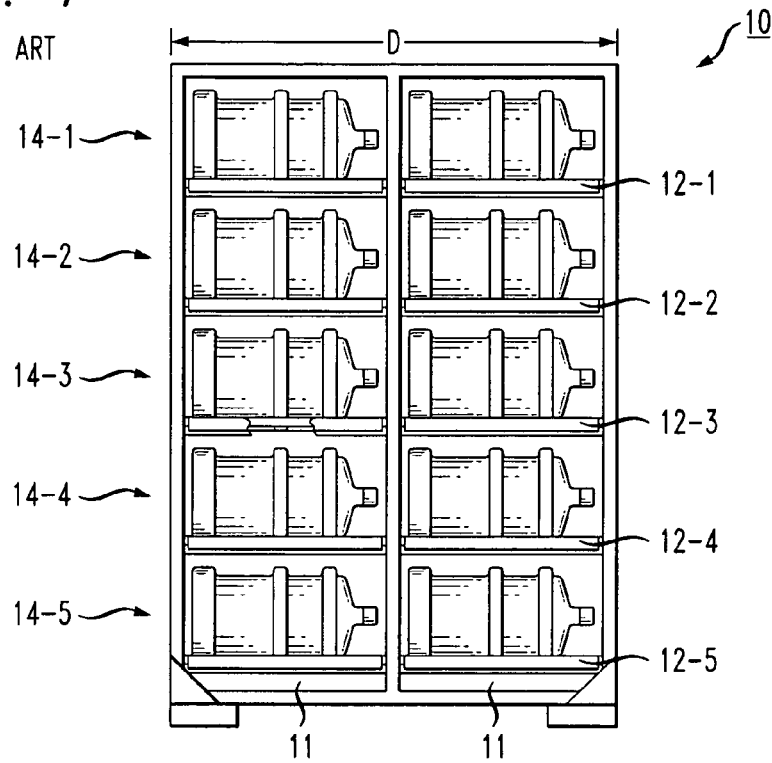
FIGS. 1-4 contain various views of exemplary prior art rack structures for supporting and transporting filled water bottles.
Figure 2:
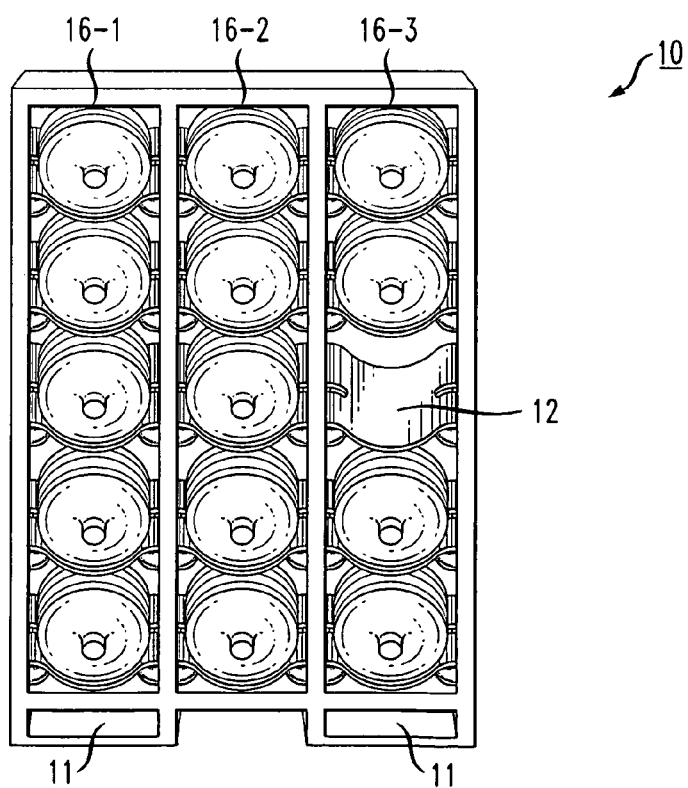
Figure 3:
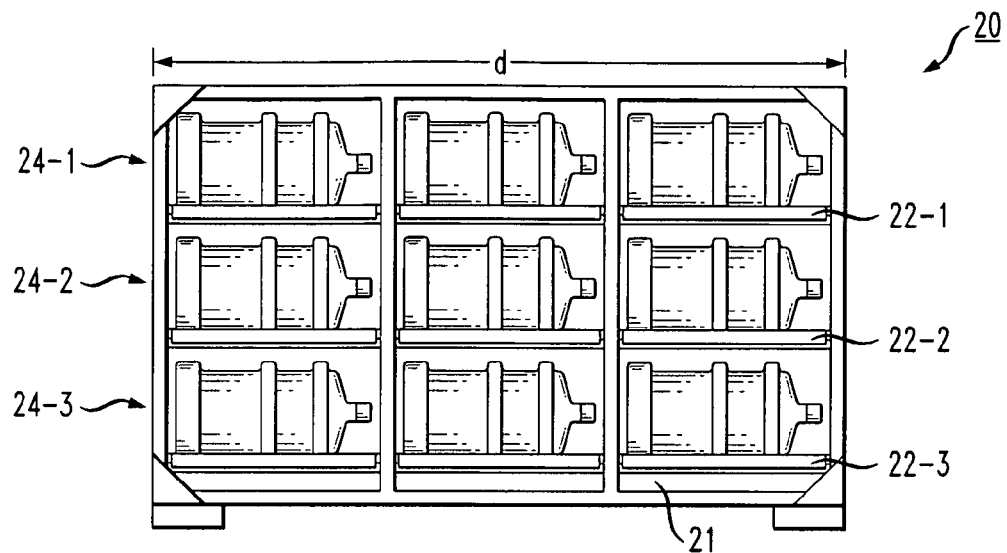
Figure 4:
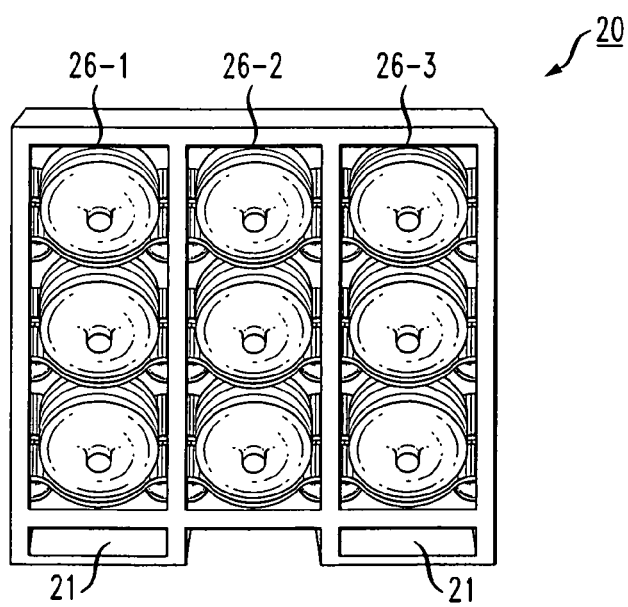
Figure 5:
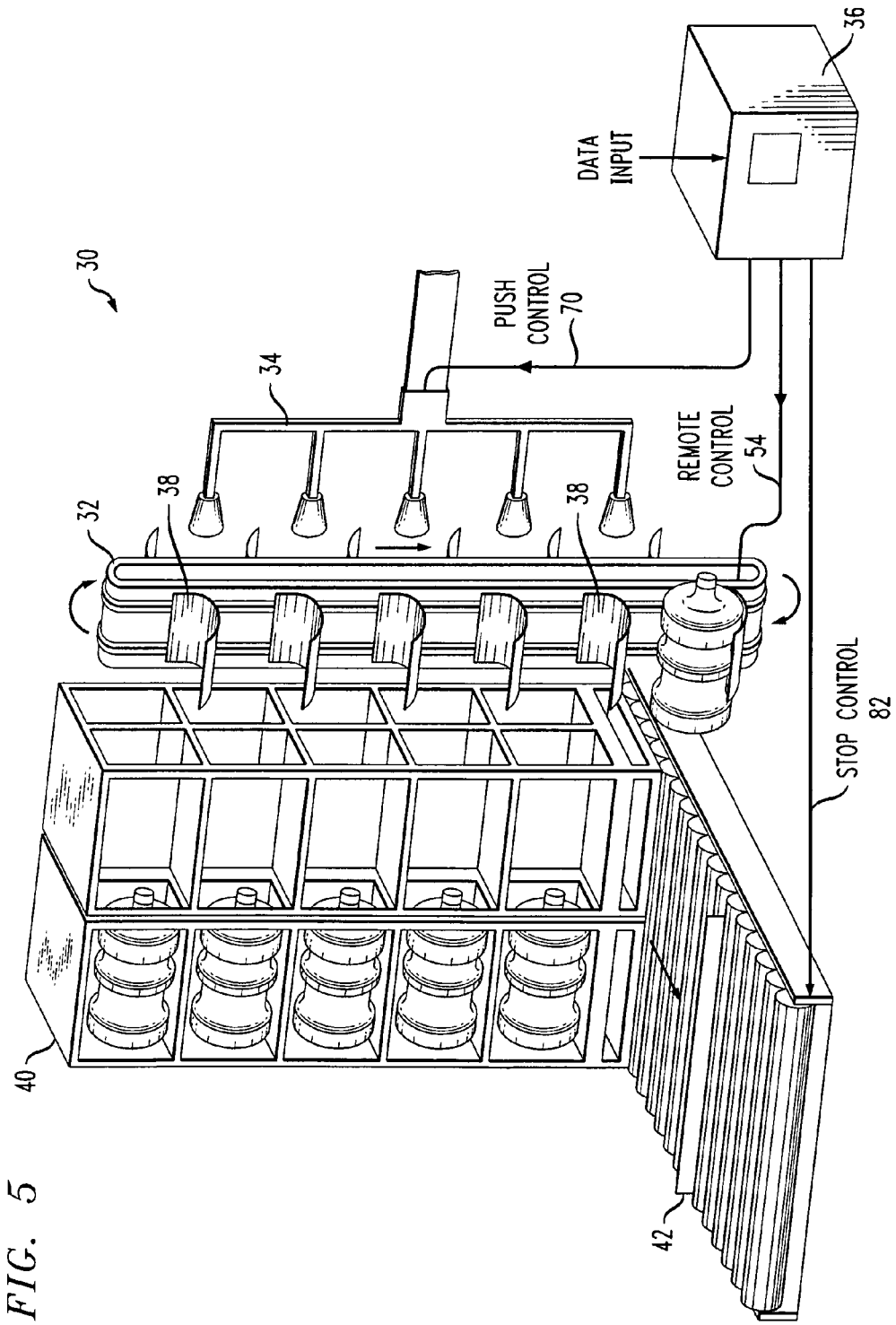
FIG. 5 illustrates an exemplary automated loader system formed in accordance with the present invention.

FIG. 5 is an isometric view of an exemplary automated rack loader system 30 formed in accordance with the present invention. Automated rack loader system 30 is illustrated as comprising an elevator element 32, a pusher element 34 and a process control unit 36. An exemplary rack structure 40 is shown in position adjacent to elevator 32 of system 30, ready to receive a load of filled water bottles. In this case, rack structure 40 is shown as being a 'two deep', 'five high' rack.

In overall operation, filled water bottles are presented in a horizontal orientation to elevator 32, where as elevator 32 rotates, the bottles will roll into an empty "seat" 38 of elevator 32. In accordance with the present invention, the positioning of sets 38 along elevator 32 is configured to match up with the openings in rack 40. Once the five elevator seats adjacent to the compartments in rack 40 are each supporting a filled water bottle, elevator 32 will be deactivated (preferably via process control unit 36, as discussed below). At this point in time, pusher element 34 is activated to urge the bottles off of seats 38 and into the open compartments of rack 40. Once the bottles are loaded in place, pusher element 34 will retract, and the process begins again with elevator 32 put in motion to accept the next set of filled water bottles. Inasmuch as rack 40 of FIG. 5 is a 'two-deep' configuration, two columns of bottles will be placed in each section of rack 40 before advancing the rack to align the next column with elevator 32. As will be discussed in detail below, a set of mechanized stops 42 may be inserted along the conveyor supporting rack 40 and used to control the advancement of the rack during loading. Advantageously, stops 42, elevator 32 and pusher element 34 are all controlled by process control unit 36, as described below, to provide the proper automated sequence of movements for each element.

Figure 6:
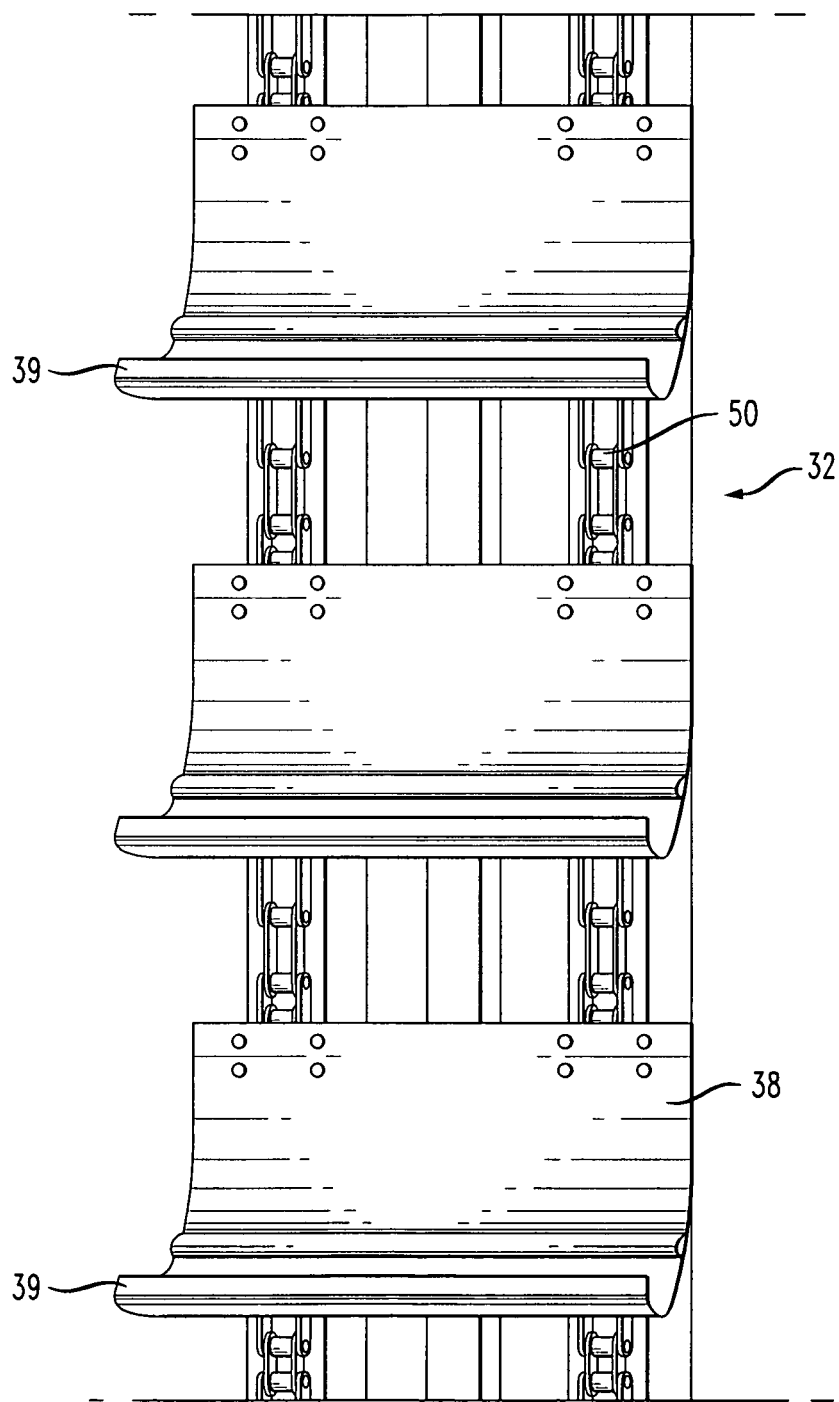
FIG. 6 illustrates a portion of the elevator component of the present invention.
Figure 7:
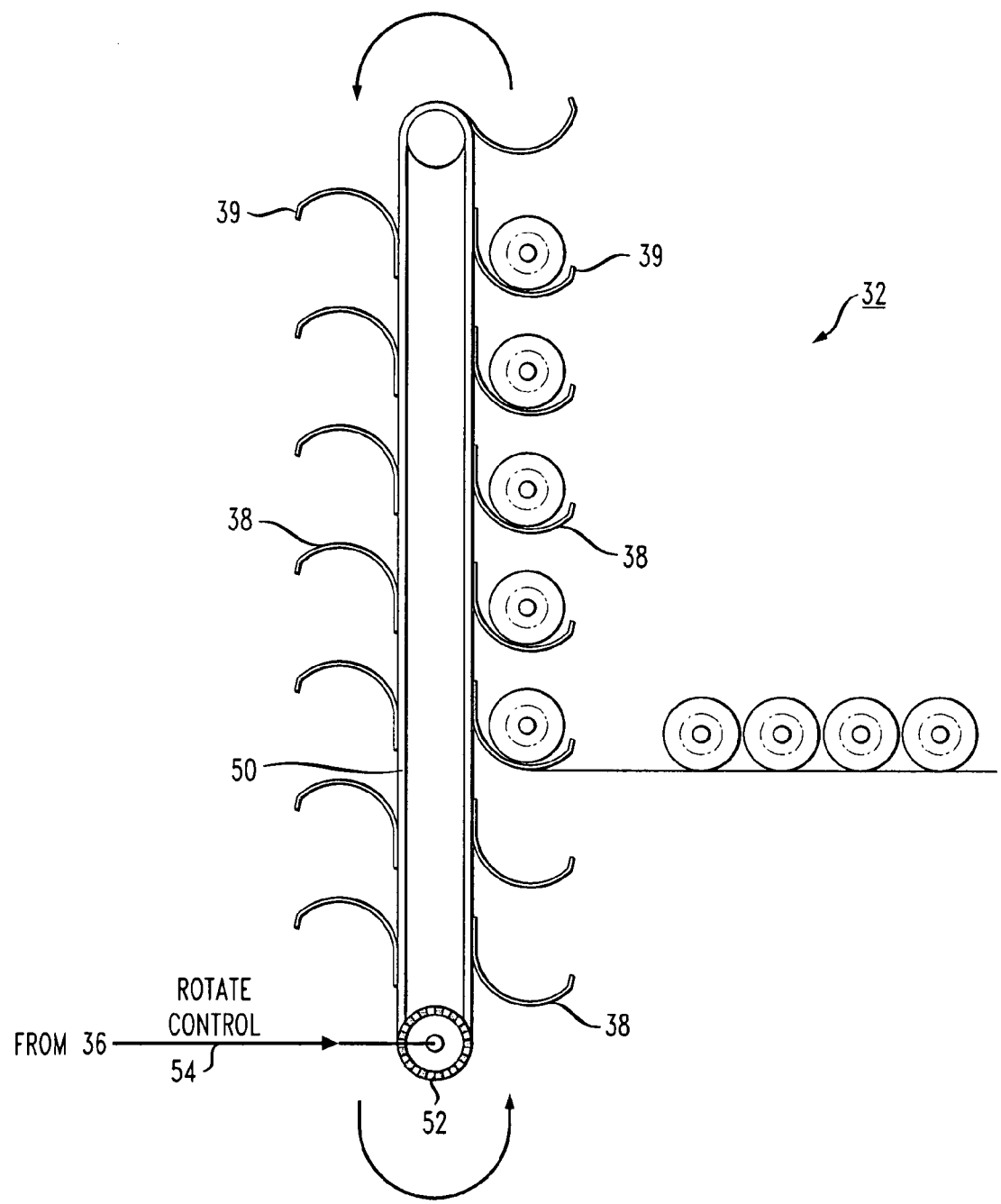
FIG. 7 contains a side view of the elevator component of the automated loader system of the present invention.

FIG. 6 is a detailed view of a portion of elevator 32, illustrating three seats 38 and their attachment to elevator 32, where FIG. 7 is a simplified side view of the complete assembly of elevator 32, showing the movement of seats 38 as the conveyor structure is rotated under the control of process control unit 36. Referring back to FIG. 6, each seat 38 is shown as bolted to a chain drive 50 that is used to provide the conveyor motion. Other types of conveyor arrangements may be used in accordance with the present invention. Seats 38 are shown as being slightly concave (best seen in FIG. 7) to accommodate the rounded shape of the bottles. Preferably, each seat 38 is formed to include a raised edge 39 as a type of "lip" to prevent the bottle from rolling off of the seat as elevator 32 is raised. Importantly, raised edge 39 needs to be high enough to prevent the bottles from rolling, while not so high as to prevent the bottle from rolling onto seat 38 in the first instance.

In the embodiment as shown in FIG. 7, a motorized gear 52 is used to engage with chain drive 50 and control the rotation of elevator 32. A control line 54 coupled between motorized gear 52 and process control unit 36 provides the signals used to activate and de-activate the movement of elevator 32. In particular, a control signal is used to allow the conveyor structure to rotate at a predetermined speed to allow, for example, a set of five water bottles to be placed in an associated set of five seats 38. Once all five seats are occupied, the control signal will change to deactivate the movement of elevator 32. Alternatively, if the rack being used is "four-high" instead of "five-high", the control signal will allow for a set of four seats to be filled, then turn "off" elevator 32. Advantageously, the use of process control unit 36 will allow for this activation/deactivation to occur automatically, as a function of the input signals applied to unit 36. In particular, the input data will define the parameters of the rack currently being loaded in terms of the number of columns, the number of rows, and the depth of each opening. With this information, unit 36 is able to properly sequence the operation of each element within the system in an automated fashion.

Figure 8:
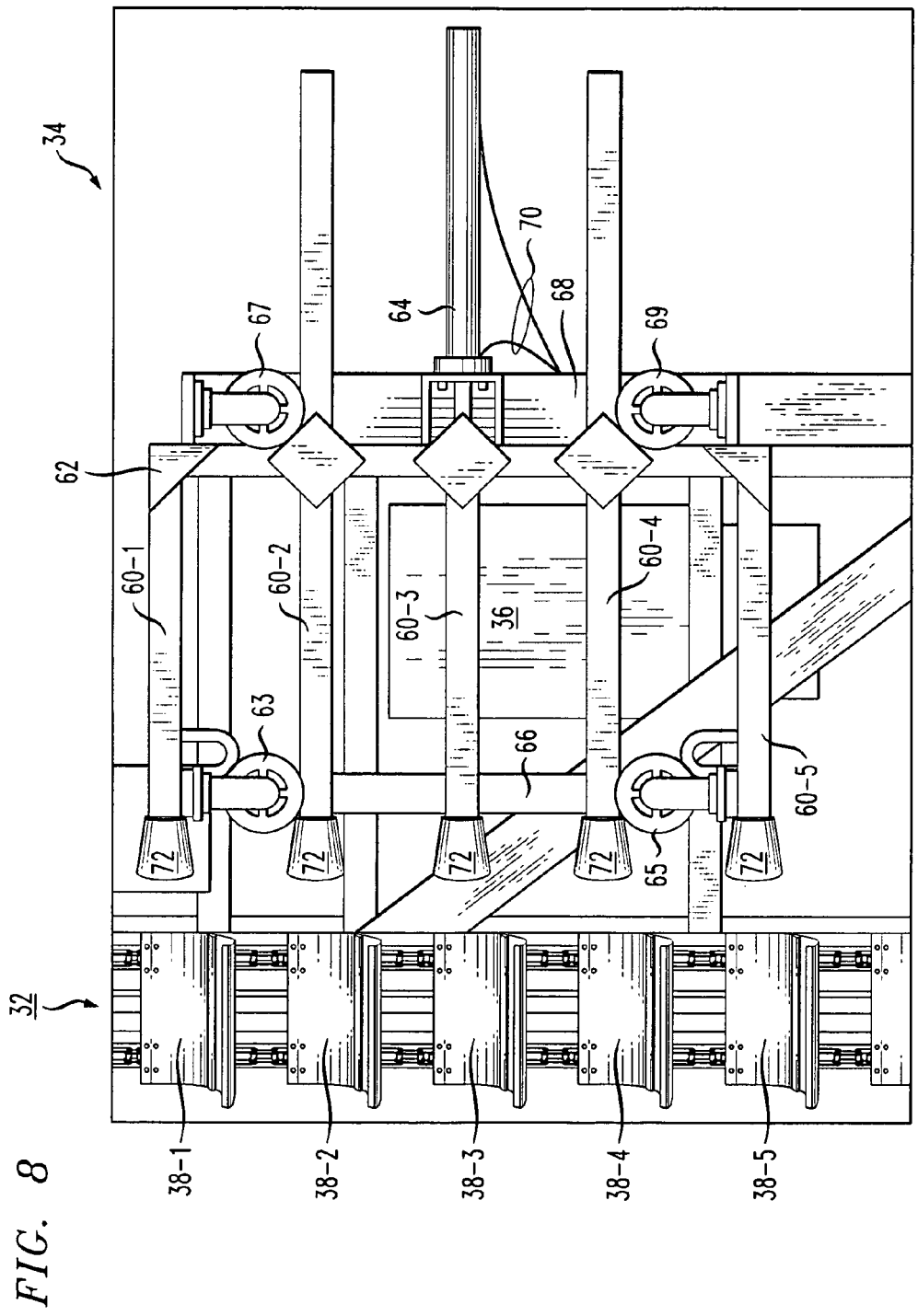
FIG. 8 is a side view of an exemplary pusher component of the present invention, comprising a plurality of push rods and associated end caps.

FIG. 8 contains a detailed view of an exemplary embodiment of pusher element 34, illustrating its placement with respect to an associated elevator 32 of automated system 30.

In this particular embodiment, pusher element 34 includes a plurality of arms 60-1, 60-2, . . . , 60-5, vertically disposed in aligned fashion with an associated plurality of seats 38-1, 38-2, . . . , 38-5 of elevator 32. The plurality of arms 60 are joined together by a horizontal tie bar 62, with a hydraulic push rod 64 coupled to tie bar 62 to control the back and forth movement of the plurality of arms 60. Additional stability is provided in this configuration by a front brace member 66 and rear brace member 68 and associated guide wheels 63, 65, 67 and 69. The additional stability allows for the horizontal movement of arms 60 to remain in alignment with elevator 32 during repetitive motions of both elements. A control signal line 70 is coupled between program control unit 36 and pusher element 34 to activate/deactivate hydraulic push rod (or other suitable mechanism) to control the motion of arms 60 in the proper sequence with the loading of the filled water bottles onto elevator 32.

Shown in particular in the illustration of FIG. 8 is the utilization of a set of end caps 72 at the termination of push arms 60, where end caps 72 are used to contact the filled bottles and provide the momentum to push the bottles from elevator 32 into rack 40. One known problem with some prior art automated rack filling systems is that the "push" force is applied to the caps of the bottles. The strength of this push force has been known to compromise the integrity of the cap and/or its seal, causing the bottle to rupture and necessitating the shut-down of the automated system. In accordance with one aspect of the present invention, a push arm has been developed that includes an end cap for surrounding the cap of the bottle and resting against the "shoulders" of the bottle, pushing the bottle instead of the cap to move the bottle into the rack.

Figure 9:
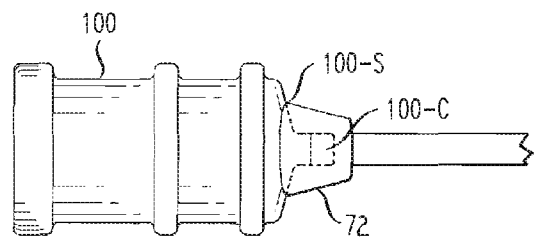
FIG. 9 shows an end cap/push rod disposed in place over a filled water bottle, showing the end cap in place against the "shoulder" of the bottle.
Figure 10:
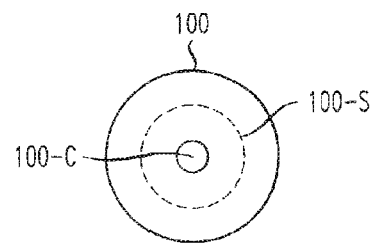
FIG. 10 is a front view of the combination of a water bottle and end cap, illustrating the location of the end cap with respect to the bottle cap.

FIG. 9 is a side view of an exemplary end cap 72 around bottle 100, resting as shown against shoulder region 100-S of bottle 100. FIG. 10 is a front view, showing the locations of shoulder 100-S and cap 100-C of bottle 100. The utilization of such an encapsulating, end cap arrangement thus shifts the point of contact between the pusher arm and the bottle from the bottle cap 100-C to the bottle shoulder area 100-S, spreading the push force across a wider area that is better able to withstand the pressure and prevent rupture during loading.

Figure 11:
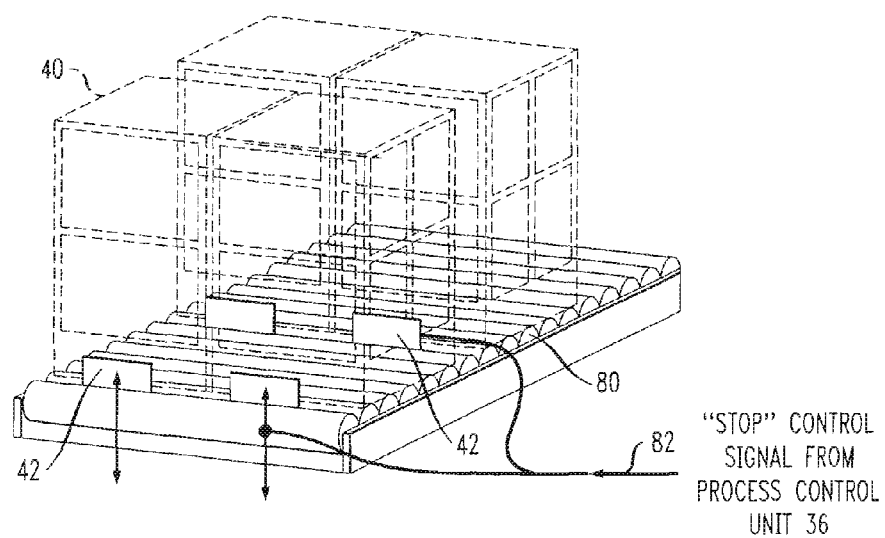
FIG. 11 is an isometric view of an exemplary conveyor support system for a rack structure, including automated stops for controlling the advancement of a rack as it is being filled in accordance with the present invention.

FIG. 11 illustrates a portion of a support structure 80 used to advance rack 40 as it is being filled, where rack 40 is illustrated in phantom in this view. In accordance with another aspect of the automated system of the present invention, a plurality of "stops" 42 are utilized along support structure 80 to control the advancement of rack 40 during filling. Stops 42 are mechanized via a control signal along line 82 from process control unit 36 so as to be in the raised position, as shown in FIG. 11, during the filling process. Once a complete column of rack 40 is filled (either two-deep or three-deep, as the case may be), stops 42 are lowered (at essentially the same time that pusher element 24 is retracted). When stops 42 are lowered, rack 40 advances via gravity action until the next empty column is in place. By knowing the time it takes for one section of rack 40 to advance, the control signal along line 82 is again activated to raise stops 42 and thus hold rack 40 in place for the next round of filling. The raising and lowering of stops 42 is repeated for each column of rack 40 until the entire rack has been filled. Once the rack is completely filled, stops 42 are again lowered to allow for the rack to exit the system (while the next empty rack is positioned in place). Again, since process control unit 36 uses input data defining the various dimensions of the rack (in terms of depth, rows and columns, for example), the movement of stops 42 can be easily controlled.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments, and that modifications to the disclosed embodiments, as well as other embodiments, are intended to be included within the scope of the appended claims. The invention is defined by the following claims, with equivalents of the claims to be included therein.

What is claimed is:

1. An automated system for loading bottles into a shipping rack structure having a depth of at least two bottles in each compartments in the shipping rack structure, the system comprising:

an elevator for accepting horizontally-oriented bottles and raising a plurality of bottles into a column configuration, forming a column of single bottles in aligned position with a plurality of compartments of the shipping rack structure, the elevator comprising a plurality of seats disposed along a conveyor, each seat for accommodating a single bottle as it loads into place, the plurality of seats disposed to align with a plurality of compartments along a column of a loading rack structure;

a pusher element for moving the column of single bottles off of the elevator seats and into the associated compartments of said shipping rack structure; and a process control unit for using as input data a set of parameters associated with the arrangement of compartments within said shipping rack structure, the set of parameters including a number of columns in the shipping rack structure, a number of rows in each column and a depth of each row where the depth of each row is defined as the total number of bottles stored in a compartment, said process control unit coupled to the elevator and the pusher element to activate/deactivate each component in sequence to provide for the automated movement of the elevator to raise the proper number of bottles into place required to fill a column of the shipping rack structure, followed by the automated movement of the pusher element to transfer to the column of single bottles into the shipping rack structure, the depth of movement of the pusher element controlled by how deep into the compartments the current column of single bottles is to be placed.

2. An automated system as defined in claim 1 wherein the automated system further comprises a plurality of stops disposed in conjunction with the shipping rack structure to control the advancement of said shipping rack upon completion of a loading cycle, the loading cycle defined as the number of separate elevate and pusher operations required to fill the depth of the compartments within a column of a shipping rack structure, wherein the plurality of stops is coupled to and controlled by the process control unit to provide for sequential operation of said stops in conjunction with the movements of the pusher element and the elevator during a loading cycle.

3. An automated system as defined in claim 1 wherein each seat of the elevator further includes an outer lip along the peripheral edge thereof, the outer lip sufficient to prevent a loaded bottle from rolling off the elevator as the seat is raised into position.

4. An automated system as defined in claim 1 wherein the conveyor comprises a chain drive and the elevator further comprises a motorized gear element, coupled to the process control unit, the combination of the chain drive and motorized gear element providing the movement of said elevator.

5. An automated system as defined in claim 1 wherein the pusher element comprises
- a plurality of pusher arms, said plurality of pusher arms disposed adjacent to, and in alignment with, the plurality of elevator seats so as to effectuate the simultaneous movement of the column of single bottles into the shipping rack structure; and
- a push rod coupled to the plurality of pusher arms and controlled by the process control unit to initiate and control the movement of the pusher arms to effectuate the transfer of the column of single bottles from the elevator to a predetermined depth within the compartments of said shipping rack structure.

6. An automated system as defined in claim 5 wherein each pusher arm further comprises an end cap configured to cover the cap of an associated bottle and provide the push force against the shoulder area of the bottle as it is being transferred from the elevator to the shipping rack structure.

7. An automated system as defined in claim 5 wherein the pusher element further comprises at least one vertical tie bar to hold the plurality of pusher arms in fixed position relative to the elevator.

8. An automated system as defined in claim 7 wherein the at least one vertical tie bar comprises a set of vertical tie bars for providing additional rigidity to the pusher element, the pusher element further comprising a plurality of travel wheels disposed between adjacent pusher arms to control the back and forth motion of said plurality of pusher arms in association with the depth of position of the current column of single bottles within the respective compartments of the shipping rack structure.

9. An automated system as defined in claim 1 wherein the process control unit includes a memory element for receiving as inputs the number of rows, columns, and depth of a particular loading rack structure, and also the size of the bottles to be loaded, the process control unit further including a microprocessor to utilize the input data to determine proper timing and sequence of movements of the elevator and pusher element to perform the loading of a column of single bottles into the shipping rack structure.

* * * * *